Jan. 6, 1942.    C. O. BALL    2,268,563
METHOD OF AND APPARATUS FOR CANNING
Filed April 2, 1938    4 Sheets-Sheet 1

INVENTOR.
Charles O. Ball
BY
ATTORNEYS

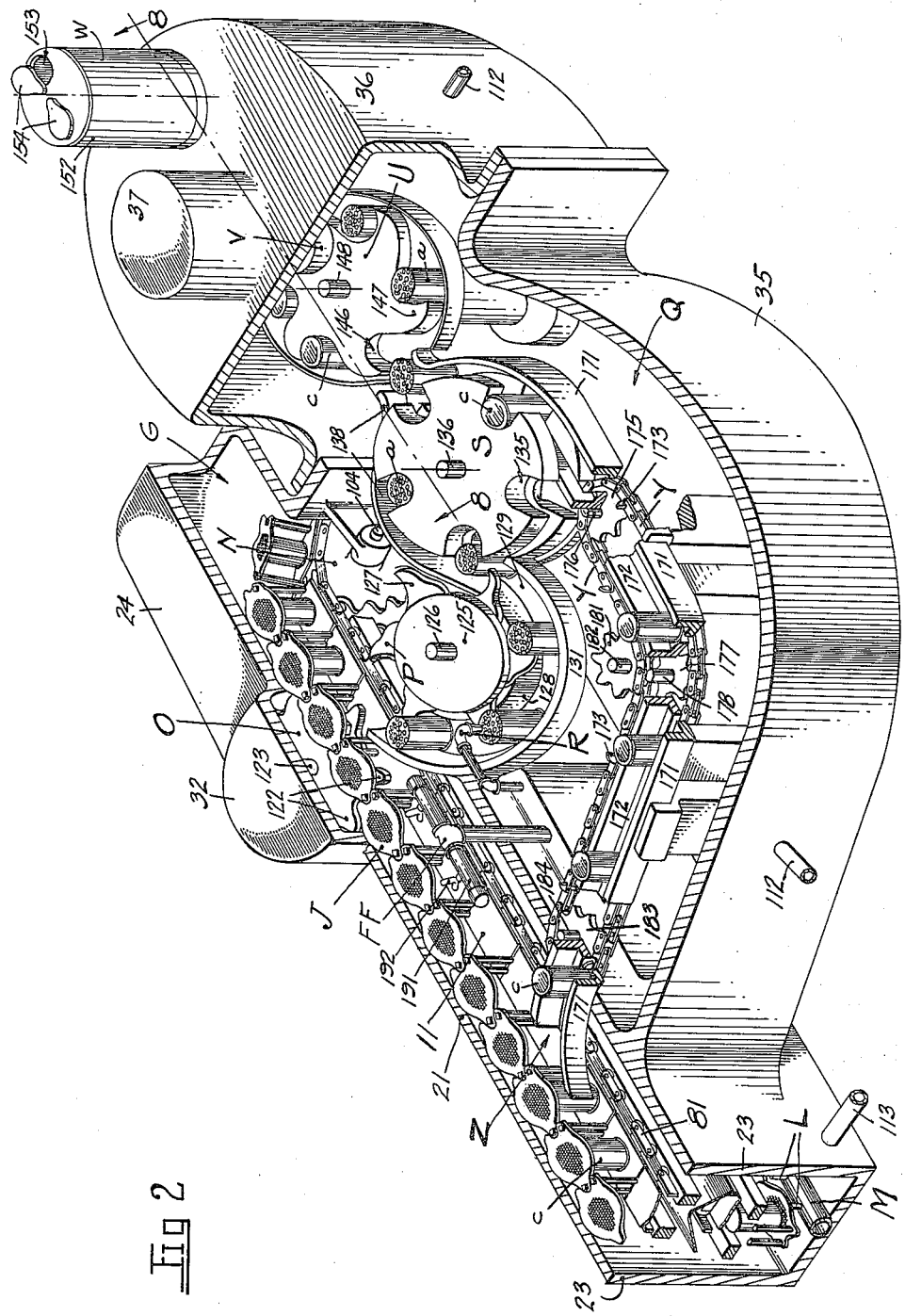

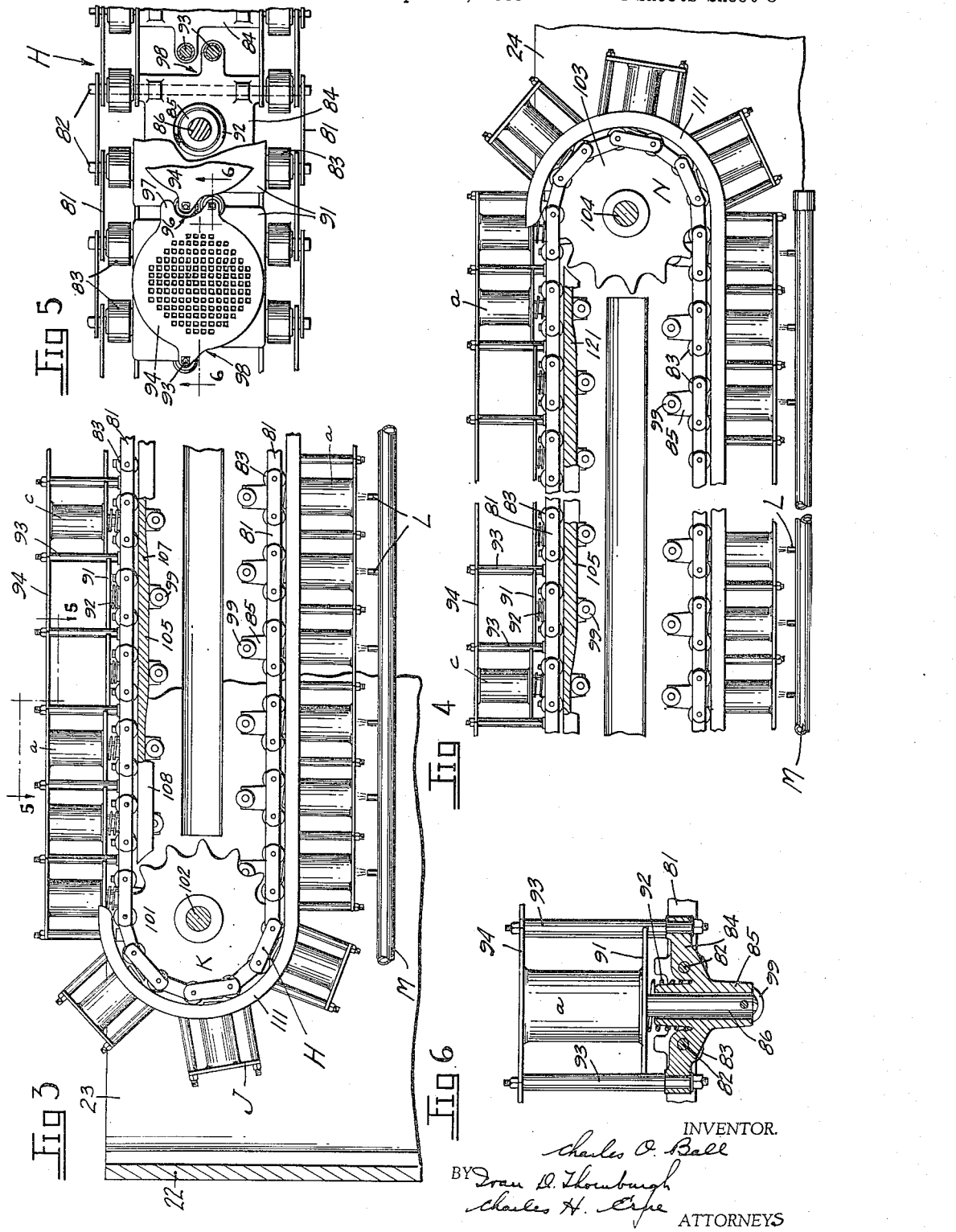

Jan. 6, 1942.  C. O. BALL  2,268,563
METHOD OF AND APPARATUS FOR CANNING
Filed April 2, 1938  4 Sheets-Sheet 4
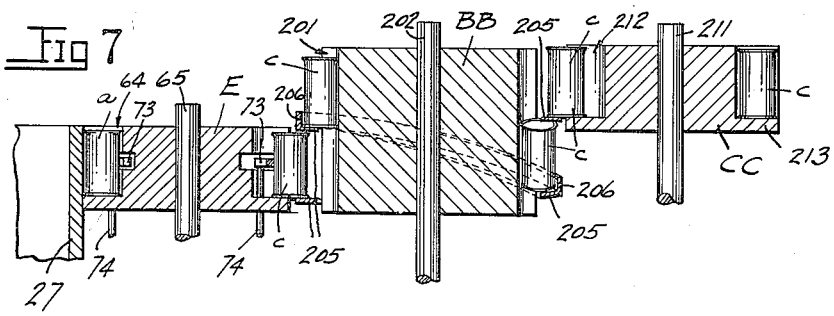
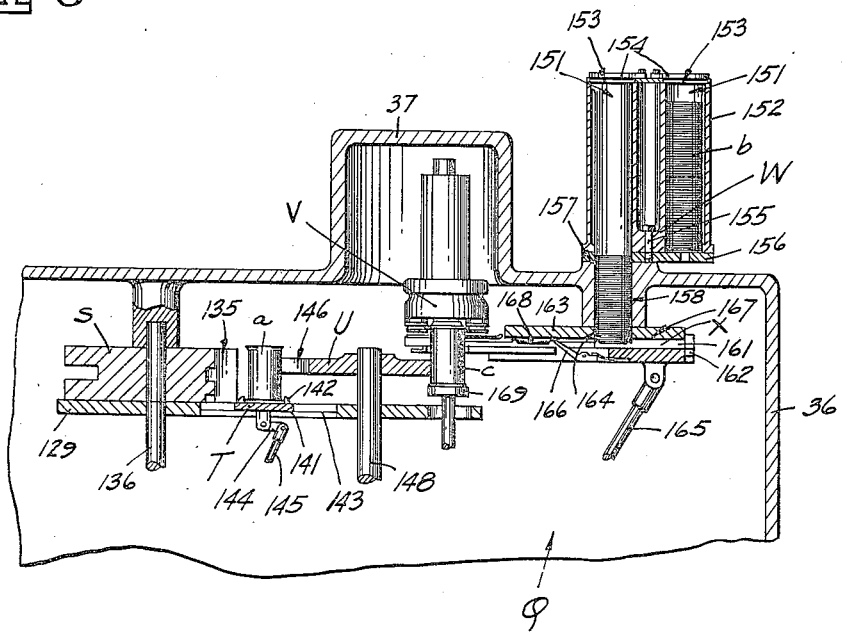
INVENTOR.
Charles O. Ball
BY
ATTORNEYS Patented Jan. 6, 1942

2,268,563

UNITED STATES PATENT OFFICE 2,268,563

METHOD OF AND APPARATUS FOR CANNING

Charles O. Ball, Oak Park, Ill., assignor to American Can Company, New York, N. Y., a corporation of New Jersey Application April 2, 1938, Serial No. 199,733

12 Claims. (Cl. 99—182)

The present invention relates to a method of canning a food product of the discrete particle type and has particular reference to a continuous process and apparatus for sterilizing the product under heat and pressure by passing it, while in the can and in an inverted position, over steam jets and within a confined chamber which is maintained under a pressure greatly in excess of atmospheric pressure.

In my joint invention with Paul C. Wilbur as embodied in United States Patent Number 2,040,726, issued May 12, 1936, on "Method and apparatus for canning," there is disclosed a method of sterilizing and sealing a product of the discrete particle type under pressure and at high temperature. In this patent there is also disclosed the sterilization treatment of a product in a can while retained in an inverted position so the condensation of steam, etc., will drain from the can.

I have found a more expeditious way of sterilizing the product while enclosed within a high temperature, high pressure steam chamber which forms the basis for this present invention. This improved manner of treatment includes passing the inverted can in close proximity to and directly over the mouth of steam jets from which the steam, issuing at a temperature and under a pressure in excess of the chamber temperature and pressure, sweeps into the can, circulates between and impinges upon the discrete particles of the product reaching the buried particles quickly and blowing out the gases liberated from the product particles thus utilizing the sterilization medium in a highly effective manner.

I have also found considerable improvement both from the standpoint of better taste in the product as well as from the saving of time of treatment in conveying the inverted cans over a series of steam jets as contradistinguished from treating the product with a continuous uninterrupted chamber heat as in my joint patent supra, the steam jetting action more quickly and more efficiently reaching all of the particles and eliminating or blowing out the enclosed gas thus removing the insulating effect of the same, the while effecting a series of repeated bombardments or shocks of steam applied directly to the individual particles of the product, and the product being free of any surrounding insulating liquid or gases within the can is thus the more vulnerable to the heat treatment.

The present invention contemplates the uninterrupted treatment of open top filled cans as they come in processional order from the filling machine or like device, each can being passed through a preliminary heat treatment under relatively small pressure to expand the product to sweep out air and gases and largely eliminate air or other gases from the head space of the can and from the interstices of the product. For many products this preliminary heat treatment is more advantageous and better adapted to cannery conditions than mechanical vacuumization.

The heated can and its heated contents according to the instant invention next pass into a chamber which is maintained under relatively high temperature and pressure. The can is inverted, its contents being prevented from falling out by a screen device carried on a continuously moving chain conveyor which advances the cans through the pressure chamber. Each can is passed successively over steam jets from which high temperature and high pressure steam escapes and this steam sweeps into the can and around the contents. The inverted mouth of the can is moved close to the issuing steam so that the full impact force will be available on the discrete particles which make up the can contents.

The high temperature steam sterilization of the product is carried on rapidly and condensation drains continuously from the can. Inasmuch as the surrounding chamber atmosphere is also under high temperature and pressure, more heating units are available for the sterilization treatment.

Cans are then turned into upright position while still within the chamber and while sterilization continues. Brine or other liquid may then be inserted if desired brining being advantageous especially for seasoning. For products such as whole grain corn or peas a very small quantity of brine suffices. Following this the can is hermetically sealed by having a cover double seamed or otherwise secured thereto. The sealed cans remain in the sterilizing pressure chamber for a holding period the temperature of the particles being that of the steam in the chamber at the time the can is sealed. The sterilization of the product reaches completion in the chamber, the heat of the latter preventing loss of heat of the product within the sealed can.

The sealed can with its enclosed sterilized contents is then cooled under a pressure which is preferably less than the chamber pressure. Further cooling may be carried on under atmospheric pressure if desired.

An object of the invention is the provision of a method of canning discrete particle food products, sterilizing the product in the can and without free liquid while subjected to heating under high temperature and high pressure and while confined within a chamber, the heat being applied as a succession of live steam jets projected into the can while it is inverted, such steam bombarding the product particles during which time condensation drains from the can following which action the can containing its product is sealed and sterilization is completed while still confined within the pressure chamber after which the sealed can with its sterilized product is cooled under pressure.

Another object of the invention is the provision of a simple and adequate apparatus for carrying out the method steps in a continuous manner permitting the entrance of an uninterrupted flow of open top cans containing raw products into the apparatus and an unbroken discharge of sealed sterilized and cooled cans therefrom.

Numerous other objects and advantages of the invention will be apparent as it is better understood from the following description, which, taken in connection with the accompanying drawings, discloses a preferred embodiment thereof.

Referring to the drawings:

Figures 1 and 2 taken together comprise a complete perspective view of the principal working parts of an apparatus capable of carrying out the method steps of the invention, Fig. 1 representing the one half of the machine and Fig. 2 the other half, the upper parts of the apparatus being broken away and parts being shown in section;

Figs. 3 and 4 taken together show as a fragmentary longitudinal section on a slightly larger scale the two halves of the continuous chain conveyor which carries the cans through the confined heating and pressure chamber;

Fig. 5 is a plan detail on an enlarged scale of two can units of the conveyor chain, partly broken back as viewed along the broken line 5—5 in Fig. 3;

Fig. 6 is a sectional detail of one of the units being taken substantially along the broken line 6—6 in Fig. 5;

Fig. 7 is a schematic spread-out longitudinal sectional view taken through two valves and a turret of the apparatus as these would appear if viewed along the broken section line 7—7 in Fig. 1; and Fig. 8 is a longitudinal sectional detail of the cover feeding and cover seaming mechanism, the section being indicated by the line 8—8 of Fig. 2.

Figure 1:
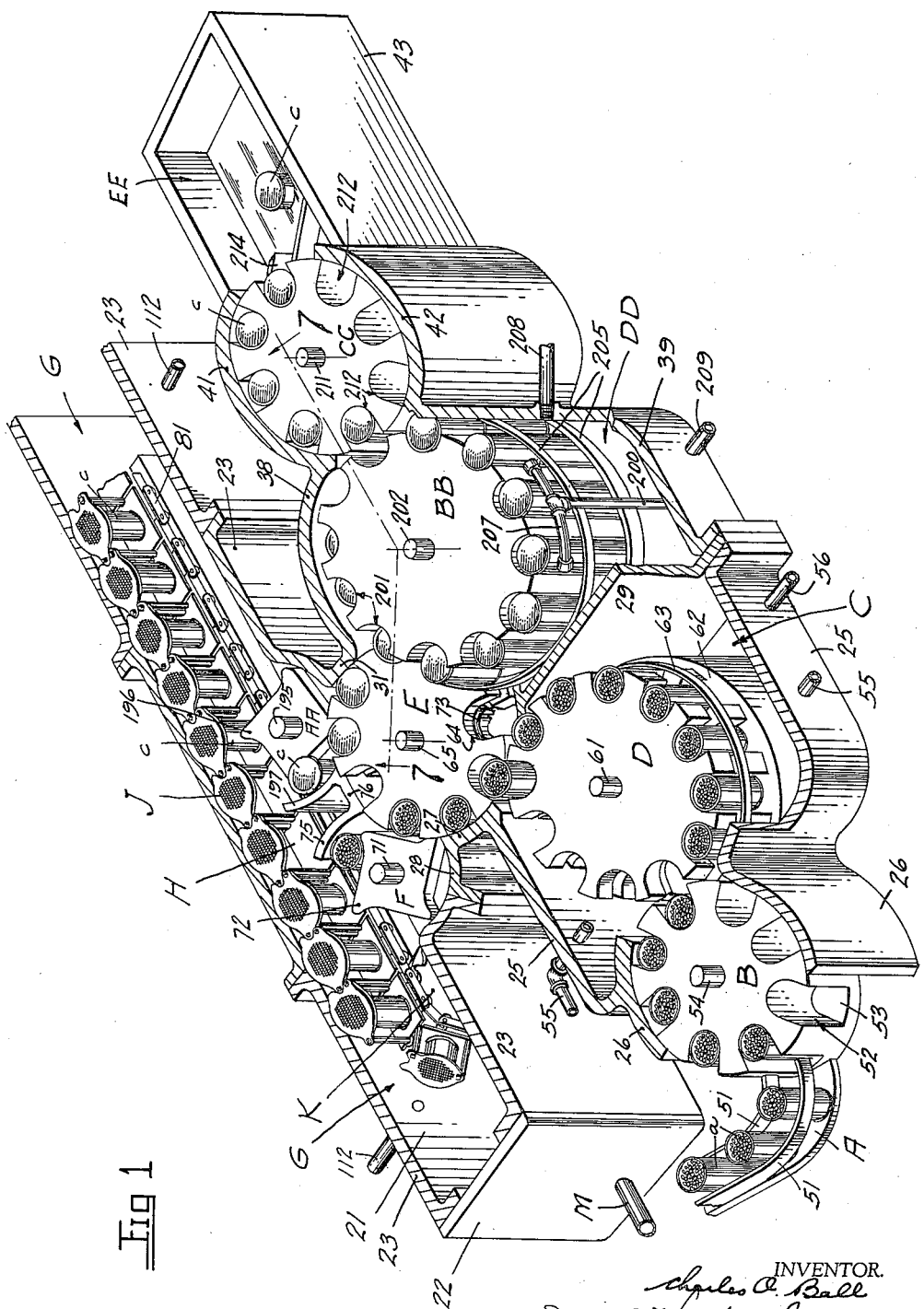

As illustrated in Figs. 1 and 2 open top cans $a$ filled with a discrete particle product such as corn, peas, beans, etc., are brought into the machine by way of an entrance runway A. The cans pass into a valve B which introduces them into a preheating chamber C. A turret unit D rotates within the chamber C and pockets of the turret receive the cans and convey them through the chamber for a preheating treatment. Jets of steam are directed into the cans in this preheating chamber.

The turret D transfers the heated cans into the pocket of a valve E which delivers one can at a time into a star wheel F located inside of a sterilizing chamber, designated broadly by the letter G.

A continuously moving horizontally disposed chain conveyor H (shown in detail in Figs. 3 to 6, inclusive) operates in the chamber and receives the cans from the star wheel F. The cans are received upon the upper run of the conveyor adjacent an end of the conveyor and the cans thereupon move on toward that end. A series of can holding screen units J are carried by the conveyor and each can moves into position within a unit. The open top of the can passes under a screen element of the unit and the can is then clamped in place within the unit.

The can is then carried around a sprocket device K over which the chain operates at the near end of the conveyor and this moves the can into an inverted position, the can being then on the lower run of the conveyor. The clamped inverted cans move toward the opposite end of the chamber G along with the lower run of the conveyor H, the screen element preventing the can contents from falling out.

This screen mouth of the can now passes over a series of nozzles L which project up from a high pressure steam supply pipe M. The pipe M is in the bottom of the chamber G and extends substantially throughout the length of the chamber. In this manner the contents of each can is subjected to the impact force of each steam jet the steam passing freely through the screen of the inverted can as it moves thereover.

At the other end of the chamber G the conveyor passes over a sprocket device N and the can is thereupon brought again into upright position and is again on the upper run of the conveyor. About this time the can is unclamped from but is still within its screen unit J. A star wheel O, which is located along one side of the conveyor, next comes into play and pushes each can from its position within the screen unit forcing the can entirely out of the conveyor from the side.

A rotary transfer device P is located on the side of the conveyor opposite the star wheel O and is housed within an extension Q of the chamber G. A cam actuated finger of the transfer device engages behind the ejected can and passes it beneath a brining nozzle R and the can is thereupon brined if that is desired.

Each can upon leaving the transfer device passes into an intermittently movable turret S also located in the chamber extension Q. It will be understood that the same temperature and pressure conditions prevail here as in chamber G. The can is placed by the turret S onto a transfer pad T (see Fig. 8) which moves the can from the pocket of the turret S into an intermittently movable star wheel U.

The star wheel U is a part of a double seaming mechanism which is located within the chamber extension Q. This seaming mechanism comprises the usual seaming rollers, chuck, etc., carried in a seaming head designated broadly by the letter V. Can covers $b$ are introduced into the chamber Q by a cover feed device W.

Individual covers are then fed from the device W by a cover feed X, a single cover being brought into the seaming head V for each can $a$ to be hermetically closed. In this way the can is hermetically sealed while still under the heat and pressure of the chamber Q and while still within the pocket of the star wheel U. Such a sealed can will now be designated by the letter $c$.

Can $c$ is next returned to the transfer device T during the time that the turret S is bringing another can into position for transfer to the star wheel. Transfer device T thereupon moves the sealed can $c$ into the pocket of the turret S which has been emptied of an open can $a$ that was placed in the star wheel pocket ahead.

A horizontally disposed endless conveyor chain Y, illustrated in Fig. 2, receives the sealed can c from the turret S. The chain Y merely propels the cans, which are suitably supported and guided by a track, and for this purpose the chain carries lugs which engage behind the cans and move them along their path of travel. Chain Y inserts the can again into a screen unit J of the conveyor H at the position Z (Fig. 2).

The can c is again clamped in the unit and advances on the upper run of the conveyor chain H toward the place where it was introduced into the chamber G by the star wheel F. A star wheel AA (Fig. 1) is located at one side of the conveyor chain in a position adjacent the valve E and this star wheel engages behind and removes the sealed can c from the conveyor chain H. The star wheel inserts the sealed can into an empty pocket of the valve E, this pocket having just been emptied of an open can by the star wheel F as already described.

Valve E next transfers the sealed can c into the lower level of a pocket of a double height cooling turret elevator BB (Figs. 1 and 7). The guideways provided for the can during its travel with the elevator BB insure gradual vertical sliding of the can within the pocket. The can during this time is being cooled and when it has moved around with the elevator for about one and a half revolutions of the latter it is in the top of its pocket. The can is now opposite a discharge valve CC.

The elevator BB is located in a cooling chamber DD which is maintained under pressure less than the pressure of the chamber G. Cold water is sprayed against the cans and the heated cans are reduced in temperature. The temperature of the chamber DD will be the result of the heat which is given off by the cans as they cool under the action of the spray water.

The cans c after passing through the rotating discharge valve CC are deposited into a water bath EE for final cooling. Such a bath may be confined within a trough section of the main frame of the machine, this water bath being under atmospheric pressure. This completes a brief general description of the operations upon the can. The cans may be removed from the water bath EE in any suitable manner. For some products the water bath may be omitted or other stages of both pressure and atmospheric cooling may be used.

As best illustrated in Figs. 1 and 2, the principal working parts of the apparatus are enclosed in a suitable frame or casing which, as herein illustrated, may consist in part of a tunnel housing 21 having an end wall 22 at one end of the apparatus. The tunnel 21 may be made up of side wall sections 23 which are bolted together or otherwise connected. At the remote end of the tunnel 21 a casting 24 closes off the end of the chamber G.

An auxiliary housing 25 (Fig. 1) may be bolted to one of the side walls 23 and this housing encloses the pretreating chamber C and the turret D. This housing is also formed with a valve seat section 26 in which the valve B is located. The inner end of the housing 25 is formed with a circular wall 27 which provides for seating the valve E on that side and the wall part 27 merges into a cylindrical wall section 28. The front end wall 23 is formed in similar manner and joined at this position to the auxiliary housing to house the star wheel F. The housing 25 is joined to a partition wall 29 which closes off the pretreating chamber.

A side wall 23 of the frame 21 is projected forward in a bulge part and in a curved section 31. The star wheel AA is located in the bulge and the curved section 31 provides a seat for the valve E on the side opposite the seat 27.

The end casting 24 is formed with a cylindrical section 32 (Fig. 2) in which the star wheel O is located. The inner wall 23 of the frame at this end of the machine is extended out into an enlarged circular housing section 35 which encloses the auxiliary chamber Q as well as the transfer device P and turret S. The conveyor chain Y is also located inside of the chamber adjacent the walls of the section 35.

The cover stack element W (Figs. 2 and 8) is mounted upon a cylindrical casing 36 which is secured to the cylindrical wall 35 on one side and to the end casting 24 on the other. This casing 36 also encloses the seaming head V, the casing being extended up in a cylindrical housing 37 for this purpose. The star wheel U is also located within the casing 36.

The valve seat 31 of the frame is merged into a cylindrical side wall 38 (Fig. 1) which forms one side at the back of the cooling chamber DD. The partition wall 29 also closes off one side of the cooling chamber. An extended wall 39, which at one edge joins to the partition wall 29, forms a part of the chamber enclosure. The walls 38, 39 are extended into cylindrical enlarged sections 41, 42 which provide a valve seat for the discharge valve CC. The water bath EE may be confined within a rectangular trough 43 which at its inner end joins to the valve seat walls 41, 42.

The foregoing broadly suggests the mechanical construction of the housing and casing walls of the apparatus. It will be understood that the top and bottom part is also closed off by suitable wall sections so that the various chambers C, G, Q and DD may be maintained under separate pressures, the various valves providing means for introducing the cans into or removing them from a chamber without disturbing the pressure contained within the chamber.

The entrance runway A (Fig. 1) is provided with side guides 51 which direct the can a in the proper line of travel. The valve B is formed with pockets 52 which are cut into the periphery of the valve from above, each pocket having a floor or can supporting section 53 on which the can rests when inserted into the pocket. The cans a may be moved along the entrance runway A and into the pocket of the valve in any suitable manner. The valve is mounted to turn with a vertically disposed shaft 54 which may be suitably journaled in bearings formed in the frame of the machine. This valve is actuated in suitable manner for continuous rotation.

As soon as a valve pocket 52 containing its can a moves past the valve seat wall 26 of the frame, communication is cut off between the pocket and the atmosphere. As the valve continues to rotate the can is brought into the preheating chamber C enclosed within the frame sections 25, 29. The preheating chamber C is preferably maintained by steam under a temperature of 220 degrees F. and at a corresponding gauge pressure of about 2½ pounds above the atmospheric pressure. This temperature and pressure may be obtained in the chamber by circulation of steam entering through entrance and exit steam pipes 55. Additional overhead steam jets are also provided, but are not illustrated, by means of which the steam may be jetted directly into the open tops of the cans. This drives out the air and other gases from the product particles, air and steam being liberally vented from the chamber by pipe 55. Condensation may be drained from the chamber by a drain pipe 56, these pipes being connected in the chamber walls 25.

The turret D within the chamber C, which receives the cans from the valve B, may be mounted upon a vertical shaft 61 which is journaled in suitable bearings within the frame of the machine. The turret is continuously rotated in any suitable manner and its rate of rotation is timed so that a pocket of the turret will be presented to a pocket of the valve B in proper time to receive the can.

The turret D is mounted to rotate over a base 62 which may be formed as an integral part of the floor of the chamber housing. This base provides a track over which the cans are slid when conveyed through the preheating chamber by the turret D. A curved guide rail 63 may be provided for holding the cans in the turret pockets during this movement and while they are within the preheating chamber. This preliminary steam treatment expands the product within the can, drives out air and gases from the product particles and heats the product to a point where air is eliminated from the head space of the can and from the interstices of the product.

The preheated can of product is next brought adjacent the valve E and the can is transferred from its turret pocket into a pocket 64 of the valve E, this being done in any suitable manner. The valve E is mounted upon a vertical shaft 65 which may be journaled in suitable bearings within the frame of the machine. The continuous rotation of the valve E is at such a rate of speed that a valve pocket 64 will be presented in proper position for receiving a can from each pocket of the turret D. After a can, within its pocket 64, has moved past the valve seat wall 27 all communication between the valve pocket and the interior of the chamber C is cut off.

The star wheel F is mounted upon a vertical shaft 71 which is also journaled in proper bearings formed in the frame of the apparatus and shaft and star wheel are rotated in proper time to bring each of its four fingers 72 into position behind a can as it is ejected from the valve pocket. Each valve pocket (see Fig. 7) carries a discharge finger 73 which is mounted on a rock shaft 74 carried in the valve and actuated in any suitable manner to discharge the can at the proper time.

After the can is swept out of the valve it is moved along a curved guide wall 75 formed in a block 76 mounted inside of the chamber G. The finger 72 of the star wheel F sweeps the preheated can beyond the guide wall and places it into one of the can screen units J of the chain conveyor H, this being in the sterilizing chamber G. The can unit is open at that time to receive it. The details of construction and operation of the unit J will be more fully set forth as the description proceeds.

The chain conveyor H (Figs. 1 to 6, inclusive) includes a pair of endless chains 81 which are held spaced from each other by equally spaced cross shafts 82 which provide for the pivot centers of the chain links. Each shaft carries two supporting rollers 83, one at each end.

Each screen unit J is carried on each pair of shafts 82 and for this purpose there is provided a block 84 through which the two shafts extend. Each block therefore is connected to its adjacent block by two of the links 81, the block taking the place of the two alternate inner chain links.

Each block 84 is formed with a central hub 85 (Fig. 6) through which a rod 86 extends. A can support platform 91 is mounted upon each rod 86 and it is on this platform that the can is moved when first brought into the conveyor H. A spring 92 surrounds one end of the hub 85 of each block 84 and this provides a yielding support for the can platform 91.

Each block 84 also carries a pair of spacing posts 93 located on opposite sides of the longitudinal center of the blocks. These posts extend up from the block 84 a distance in excess of the can height and each pair of posts carries a perforated or screened plate 94. All of these elements are included in the screen J.

The front post 93 of one block extends alongside of the rear post of an adjacent block when the chain is straight, i. e., when that part of the chain is not passing over a sprocket, and to permit this each screen plate is cut away at one end to provide a pocket 96. The wall of the pocket joins with a projection 97 which as shown in Fig. 5 provides a clearance and an interlocking of the screen plates. The support plate 91 is also relieved as at 98 to clear the two posts 93 of the adjacent can support units on the two sides.

Each rod 86 carries a roller 99 which is used for drawing the platform 91 away from the screen plate 94 of that unit, this opening the unit for the reception or discharge of a can. The can is received into the chain two times and is twice discharged during one cycle of chain travel. This will be further described at the proper time.

It has already been mentioned that the conveyor H passes over the sprocket device K. This device comprises a pair of sprockets 101 (Fig. 3) over which the chains 81 pass. These sprockets are mounted on a horizontal shaft 102 journaled in proper bearings formed in the frame walls 23 at the forward end of the apparatus this being adjacent the end wall 22.

At the opposite end of the chamber G where the conveyor H takes over the sprocket device N, there are two sprockets 103 (Fig. 4) which are mounted upon a shaft 104 and this shaft may be journaled in suitable bearings formed in the frame housing. Shaft 104 may be the drive shaft for the conveyor H or if desired shaft 102 may be made the drive shaft.

During the time the can support units J are passing with the upper run of the conveyor, the chain rollers 83 rest upon and move over a supporting track 105 (Figs. 3 and 4). This keeps the chain in a straight line of travel and in a horizontal plane and insures proper positioning of the moving can units during the travel of these units through the various parts of the chamber.

As has already been mentioned, the can screen unit J is open when a can is put into the chain H by the star wheel F. As the unit approaches the star wheel F to receive a can its roller 99 engages beneath a cam surface 107 formed on the under side of the track 105. This cam surface extends down in a slight incline which causes the rod 86 and the support plate 91 of the unit to move down against the yielding action of the spring 92 so that the support plate 91 is in a lowered position. This is the open position of the unit.

In this lowered position the support plate 91 is spaced far enough below the rigidly mounted perforated plate 94 so that a can may be easily moved into and out of the unit. After the conveyor has received its can from the star wheel F the unit containing the can advances toward the left as viewed in Fig. 3 and the roller 99 moves along the cam track 107.

This cam surface soon changes from horizontal into an upwardly inclined portion and the roller 99 and the rod 86 being no longer held down are lifted, along with the support plate 91 and its supported can $a$, by the spring 92 of the unit. The can is lifted until its open top meets the screen plate 94 and thereafter the spring holds the can securely clamped between the plates 91, 94.

The track 105 is provided with a side rail 108 which retains the rollers 99 against lateral shifting this also guiding the chain links 81 and the supporting chain rollers 83 into proper position for movement by the sprockets 101.

As a can $a$ clamped on its supporting unit J passes over the sprocket 101, it is inverted (as best illustrated in Fig. 3) and the perforated plate 94 then forms the support for the inverted can. Side supporting rails 111 mounted in any suitable manner are located on both sides of the conveyor chain and the chain rollers 83 engage and ride on the rails as the unit J passes over the sprocket and after the can and its holding unit have been brought down to the lower run of the conveyor. This chain support afforded by the rails 111 continues for the entire lower run of the chain and until the units carried thereby are again brought onto the upper chain run.

The pressure chamber G is adapted to be maintained under a steam temperature of 280.6 degrees F. with a corresponding pressure of 35 pounds above atmospheric pressure. This steam supply may be obtained in any suitable manner as by steam pipes 112. Two of these pipes are shown in Fig. 1 and they extend through the casing wall 23. Other pipes 112 (Fig. 2) may also extend through the walls 35 and 36. A drain pipe 113 may also be provided for carrying off condensation draining from the can during its travel through the chamber G and while in inverted position and also for condensate draining from the surfaces of the chamber walls.

As soon as the can $a$ has been inverted and brought to the lower run of the conveyor, it moves over the series of nozzles L which are mounted in and which project up from the high pressure steam supply pipe M. Where the temperature is 280.6 degrees F. and the pressure is 35 pounds in the chamber G, the high pressure steam pipe M will carry steam at a temperature of 297.7 degrees F. with a corresponding pressure of 50 pounds above atmospheric.

This passing of the perforated plate 94 and its inverted can close to and successively over the steam jets, insures sweeping of the steam issuing from the nozzles, through the perforations and into the can thus sweeping gases out of the can and distributing the temperature quickly throughout the can and at the same time subjecting the can contents to not only the heat but the impact of the steam. The nozzles L extend all the way along the lower run of the conveyor H during which time the heat is carrying on sterilization of the contents.

At the opposite end of the pressure chamber G, that is within the casing 24, where the conveyor passes over the sprockets 103, the can is again righted and is brought again onto the upper run of the conveyor. Leaving the sprocket 103 the roller 99 of the can unit passes beneath and engages a second cam surface 121 (Fig. 4) formed on the under side of the track 105. Again the support plate 91 with its can is moved down and the can is unclamped. This frees the open mouth of the can from the perforated plate 94 and in this lowered, unclamped condition the can approaches the star wheel O.

A finger 122 of the star wheel O engages behind the can and pushes it forward off of its support plate 91, this finger extending in between the posts 93 of the can support unit J. The star wheel O is mounted upon a vertical shaft 123 which is journaled in suitable bearings formed in the frame or housing of the apparatus and is timed to rotate in proper synchronism with the movement of the conveyor chain so that each star wheel finger 122 passes into and may discharge a can from each can support unit.

The discharged can is next engaged by the rotary transfer device P as illustrated in Fig. 2. The rotary device P comprises a fixed top cam plate 125 which is secured to a vertically disposed fixed shaft 126. As herein disclosed six fingers 127 are carried on a rotatable body part 128 which is suitably actuated to revolve around the vertical shaft 126. Each finger may be mounted to pivot on the body and may be actuated in suitable manner by the cam plate 125 to insure proper engagement of a can, to slow down the can travel or accelerate it as desired. This irregular can travel permits holding the can long enough for brining at the brining nozzle R. Such a can travel device is well known in the can making art.

During this movement by the transfer device P, the can is slid over a support track 129 carried in the frame of the machine and located directly beneath and extending laterally relative to the body of the transfer device. The can is retained in position within range of its finger 127 by a circular guide rail 131.

As the can stops at or moves slowly beneath the brining nozzle R, the desired liquid is squirted into the can contents. Provision may be made, if desired, to insure discharge of brine from the nozzle only when a can is properly positioned by the finger 127. This incidental feature of valve control of nozzle discharge is not illustrated in the drawings. Obviously some products do not require brine and in that event no liquid flows into or from the nozzle R and the cans passing under the nozzle are not affected in any way by their transfer through the brining station.

By reason of the cam movement of the individual fingers 127 of the transfer device P a can propelled by the transfer finger is introduced at the proper time into a pocket 135 of the intermittently movable turret S. This turret is mounted upon a vertically disposed shaft 136 which is journaled in suitable bearings formed within the frame of the apparatus and is intermittently moved so that a pocket 135 is brought to rest adjacent the transfer turret in the proper time to receive a can.

During the intermittent movement of the can $a$ when in the turret S, it is held in the pocket of the turret by a circular guide wall 138 which is concentric with the turret shaft 136. This guide wall may be suitably mounted in and fixed to the frame of the machine.

A can while in a pocket 135 of the turret is first brought to rest at an idle station. At the second stop of the turret the can is deposited on the top of the transfer pad T (Fig. 8).

The transfer pad, comprising a can receiving disc 141, is provided with can retaining fingers 142. These fingers insure proper centering of the can. The disc 141 is mounted in a slideway 143 formed in the support plate 129 which at this position extends beneath the turret S and also below the star wheel U. The disc 141 is connected at 144 to an actuating lever 145 which moves the disc back and forth between turret S and the star wheel U.

When a can has been deposited upon the disc 141 the lever 145 slides the disc toward the right (as viewed in Fig. 8) and removes it from the turret pocket 135 and places it into a pocket 146 formed in the star wheel U. Star wheel U is formed with fingers 147 and is mounted upon a vertically disposed shaft 148. This shaft is suitably journaled in the frame and is intermittently rotated, being properly timed relative to the turret S so that cans may be transferred both ways therebetween.

The can ends b as received in the cover feed device W are stacked from the outside, within one of two pockets 151 formed in a cylindrical shell 152. At the top the shell is provided with openings 153 and a cover plate 154 is provided for each opening 153. The cover plate 154 of the pocket into which the covers are stacked is pushed aside to allow their insertion through the opening 153 and into the pocket.

After the pocket 151 is filled with covers the cover plate is closed and the cylindrical housing 152 is then rotated through 180° on its longitudinal center. This alternates the positions of the two pockets 151. To permit this, the shell 152 is rotatably mounted at 155 on a support plate 156 carried on the top of the machine housing 36.

In this altered position of the pockets 151 the newly filled stack of covers is in register with an opening 157 cut through the plate 156. This opening leads into a tubular channel 158 formed in the frame of the machine.

The lower end of the channel 158 opens onto the cover feed X which comprises a slide bar 161 which is mounted within a slideway 162 formed in a cover feed plate 163. The plate 163 is also formed with an opening 164 which aligns with the tubular channel 158. The lower end of the stack of covers now rests on the feed bar 161.

The feed bar is actuated by a lever 165 which moves the feed slide 161 toward the left as viewed in Fig. 8 and removes the lowermost can cover from the stack extending into the tubular channel 158. The feed bar 161 carries a spring pressed feed finger 166 and the bar is also formed with a feed notch 167. The first sliding movement of the bar engages the notch 167 on the lowermost cover and moves it from the stack bringing it to rest at an idle station designated in the drawings by the numeral 168. The feed bar is then returned to the former position and upon its next forward movement, the feed finger 166 engages the cover at the position 168 and feeds it into position under the seaming head V.

In the meantime the star wheel U has moved through several idle stations and the can being brought into the seaming head and still within one of the pockets 146 passes onto a lifter plate 169 of the seaming mechanism. During the rest period of the star wheel U which immediately follows, the lifter plate 169 raises the can a into the seaming head V the can thereupon picking up the fed cover b in the usual manner. Can and cover are thereupon hermetically sealed by the seaming mechanism.

Following the seaming the lifter plate 169 moves down and the sealed can c continues its advance. Subsequent step movements of the star wheel U brings the seamed can c again into position adjacent the turret S. The double transfer of open cans a and seamed cans c will now be explained.

When the turret S comes to rest in depositing a can a upon the transfer device T as just described, the star wheel U is at rest with an empty pocket 146 opposite to receive it.

The next adjacent pocket of the star wheel, however, contains a sealed can c ready for discharge. As soon, therefore, as the open can a is transferred into the pocket 146 of the star wheel U the latter moves through a step cycle and the seamed can c within its adjacent pocket 146 is deposited upon the disc 141 of the transfer device, this being done while the turret S is still at rest. The transfer device T then operates in the opposite direction discharging the can c from the pocket of the star wheel U and placing it into the emptied pocket 135 of the turret S. Thus it will be seen that two pockets 146 of the star wheel move past each pocket 135 of the turret.

The turret S next moves to carry the seamed can c into an idle station and it is this movement that brings the unseamed can a in the following adjacent turret pocket 135 into alignment with the emptied pocket of the star wheel U. As the seamed can c moves with the turret S, it is held in the pocket 135 by a curved channel guide rail 171. This channel rail extends from the turret S and over the outer run of the endless conveyor chain Y. It also has an inner rail section 172 as illustrated in Fig. 2.

The conveyor chain Y into which the can c passes from the turret S, comprises an endless chain having spaced can engaging flights 173. The chain at its can receiving end passes over a horizontally disposed sprocket 175. This sprocket is carried on a vertically disposed shaft 176. From the sprocket the outer run of the chain passes over a sprocket 177 mounted on a vertical shaft 178 and the inner run of the chain passes over a sprocket 181 carried on a vertically disposed shaft 182. This provides a right angle change of direction of movement for the can after it has been delivered onto the chain Y.

At its discharge end, the conveyor chain Y passes over a sprocket 183 which is mounted upon a vertically disposed shaft 184. The sprocket shafts 176, 178, 182 and 184 are journaled in suitable bearings in the frame of the machine and one or more of the shafts may be rotated so that the chain Y moves continuously in proper time to receive a can c from the turret S and to convey the can along its right-angled travel within the channel members 171, 172.

Returning for the moment to consider the conveyor H, as soon as a can a has been ejected from the support unit J of the conveyor chain by the star wheel O, already described, the unit passes a cleaning station FF (Fig. 2). A water supply pipe 191 is provided at one side of the conveyor and nozzles 192 carried in the pipe project streams of hot water or other cleaning fluid against the conveyor chain and associated can support unit parts so that any dirt or foreign matter will be removed from the conveyor chain. The units J of the conveyor are thus empty when passing through this cleaning spray.

At the position Z the cleaned can holding units J of the conveyor chain pass adjacent the sprocket 183 and a seamed can c moving along the guideway 171 is projected by movement of a lug 173 on the chain Y, into one of the can units of the conveyor chain H. The can again passes beneath the perforated or screen plate 94 and comes to rest upon the support plate 91. At this time the support plate is still in its lowered position, its roller 99 still being engaged by the cam track 121. As soon as the can comes into position between the perforated plate above and the support plate below, the cam track 121 terminates and the spring 92 of the can support unit again raises the can into clamped position against the perforated plate 94.

It will be understood that during the seaming of a cover onto the can and in fact from the time the open top can a leaves the conveyor chain H to receive its cover and until the seamed can c is again brought back into position in the chain, that the temperature and pressure of the chamber G and of the chamber extension Q is effective upon the can. This pressure prevents bursting of the sealed can and the continued heat aids in its continued sterilization.

The newly clamped can c carried upon the upper run of the conveyor H continues its advancement (toward the left in Figs. 1 and 2) and now approaches the star wheel AA. At this time the cam roller 99 of the can support unit J again engages the cam surface 107 and the can is again slightly lowered to unclamp it or to disengage it from the perforated plate 94 of the unit preparatory to removal by the star wheel AA.

The star wheel AA is mounted upon a vertically disposed shaft 195 which is journaled in suitable bearings within the frame of the machine. One of the several fingers 196 of the star wheel AA now passes in between the posts 93 and slides the can c off of its support plate 91. At the same time the can moves along a circular guide wall 197, which may be an integral part of the block 76.

The star wheel AA moves the can into an empty pocket 64 of the valve E. The valve E passes the can along the valve seat wall 31 and positions it into the lower end of one of several peripheral pockets 201 (Figs. 1 and 7) formed in the elevator BB.

This elevator is mounted upon a vertical drive shaft 202 which is journaled in proper bearings formed in the frame of the machine and is actuated so that it will have a continuous rotation, the rate of which corresponds with the movement of the valve E. The transfer of the can from valve to elevator is effected by the discharge finger 73 for that pocket of the valve. The can as it enters the bottom of the elevator pocket 201 passes onto a guide track 205.

The track 205 surrounds the elevator and is inclined upwardly to provide a helical path as best illustrated in Fig. 7. It is also provided with a guiding side ledge 206 and as the can c moves up and around it comes into a raised upper level so that when again adjacent the valve E it is in the top of the elevator pocket and is directly above a can c which at that time is being transferred into the same elevator pocket at the lower level. In other words, with the apparatus in full operation, immediately after a can passes into the pocket 201 of the elevator BB there are then two cans in the same pocket one being above the other.

The elevator makes a half turn following this first complete rotation which further raises the can in its helical track. The elevator BB is located in the cooling chamber DD which is preferably held under a pressure of substantially 25 pounds. It is while the cans are in the elevator that they are reduced in temperature and the pressure of the cooling chamber prevents undue straining of the seams of the can during such cooling.

The cooling of the can is effected by water sprays applied from the outside. These sprays strike the cans on the upper level and the water flows down over the cans below. For this purpose cold water is introduced through a water supply pipe 200 (Fig. 1) which connects with a horizontal curved pipe manifold 207. The latter is perforated on the side next to the cans and this provides the sprays or jets of cold water for cooling.

Both the quantity and temperature of the cooling water will be such as to maintain a desired temperature in the chamber DD and this water reduces the temperature and pressure of the product sealed within the can. The proper pressure of the cooling chamber DD may be brought about by compressed air and for this purpose an air pipe 208 is provided. It extends through the wall 39 of the cooling chamber. A drainage pipe 209 is also provided for draining out the water from the cooling chamber.

After passing through about 550 degrees of travel with the elevator BB the can in the upper part of the pocket 201 of the elevator is brought adjacent the discharge valve CC.

This valve is mounted on a vertical shaft 211 which is journaled in suitable bearings formed in the frame of the machine. The valve CC (Fig. 7) is provided with can pockets 212 which, like the valve B, extend down from the top leaving a support 213 at the bottom of the pocket. The can as it discharges from the top of its pocket in the elevator BB moves onto the support 213 of one of the pockets 212 of the valve.

By reason of the valve seats 41, 42 the pocket containing the can as it rests in the valve CC is soon cut off from the pressure of the cooling chamber DD and is thence carried around a circular path of travel adjacent the valve seat wall 41 to the point of discharge.

As the pocket containing its partially cooled can c passes beyond the valve seat wall, pocket and can are subjected to the atmosphere. An inclined chute 214 is located adjacent the discharge side of the valve CC to receive the cans and direct them into the cooling bath EE. This further cools the can and completes the operations of the apparatus under consideration.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. The method of canning which comprises introducing an open top can of product of the discrete particle type into a closed sterilizing chamber, maintaining the chamber under high temperature and pressure, clamping the can in inverted position while holding its product therein, introducing live steam at a temperature and pressure in excess of that in said sterilizing chamber and directly into the product while held in said inverted position to sterilize the product and to drain condensate from the can, re-righting said can and releasing the same from clamped position, and then hermetically sealing the product in the can while still in said sterilizing chamber.

2. The method of canning which comprises introducing an open top can of product of the discrete particle type into a closed sterilizing chamber, maintaining the chamber under high temperature and pressure, clamping the can in inverted position while holding its product therein, passing the inverted can over stem jets while introducing live steam at a temperature and pressure in excess of that in said sterilizing chamber and directly into the product held in said inverted can to sterilize the product and to drain condensate from the can, releasing said can and turning the same with its product into upright position, introducing a can cover into said sterilizing chamber, and then hermetically sealing the product in the can by securing said cover thereon and while still in said sterilizing chamber.

3. The method of canning which comprises introducing an open top can of product of the discrete particle type into a closed pretreating chamber to eliminate air from the can and product by steam pressure, passing the can with its product into a closed sterilizing chamber, maintaining the chamber under high temperature and pressure, clamping the can in inverted position while holding its product therein, introducing live steam at a temperature and pressure in excess of that in said sterilizing chamber and directly into the product while held in said inverted can to sterilize the product and to drain condensate from the can, releasing said can and returning the same with its product to its upright position, hermetically sealing the product in the can while still in said closed sterilizing chamber, and then cooling the sealed can while still maintaining the same under pressure in said closed chamber.

4. The method of canning which comprises introducing an open top can of product of the discrete particle type into a closed pretreating chamber to expand the product and to eliminate air from the can and product by steam pressure, passing the can with its product into a closed sterilizing chamber, maintaining the chamber under high temperature and pressure, clamping the can in inverted position while holding its product therein, introducing live steam at a temperature and pressure in excess of that in said sterilizing chamber and directly into the product held in said inverted can to sterilize the product and to drain condensate from the can, releasing said can and returning the same with its product to its upright position, filling a liquid into the can with its product, hermetically sealing the product in the can while still under pressure in said closed sterilizing chamber, partially cooling the sealed can under pressure, and then completing said cooling of the sealed can in a bath of water.

5. The method of canning which comprises introducing an open top can of product of the discrete particle type into a closed pretreating chamber maintained under pressure to eliminate air from the can and product, passing the can with its product into a sterilizing closed chamber which is under high temperature and pressure, clamping the can in inverted position while holding its product therein, introducing live steam at a temperature and pressure in excess of that in said sterilizing chamber and directly into the product held in said inverted can to sterilize the product while at the same time draining liquid from the can, releasing said can and turning the same with its product into upright position, introducing a can cover into said sterilizing chamber, hermetically sealing the product in the can by securing said cover thereon and while can and cover are under pressure in said sterilizing chamber, and simultaneously maintaining the pressures in the pretreating chamber and in the sterilizing chamber without loss of temperature and pressure occasioned by passing cans and covers therethrough.

6. The method of canning which comprises introducing an open top can of product of the discrete particle type into a pretreating closed chamber, introducing live steam into said chamber and maintaining the chamber at a pressure in excess of atmospheric pressure, said live steam also passing into the product to sweep non-condensible gases including air out of the product and from the can the while heating the product, transferring the can with its heated product into a closed sterilizing chamber, maintaining said sterilizing chamber under high temperature and pressure by the introduction of live steam, clamping the can in inverted position while holding its product therein, introducing live steam at a temperature and pressure in excess of that in said sterilizing chamber and directly into the product held in said inverted can to sweep non-condensible gases out of the product and to rapidly bring the product to sterilizing temperature while at the same time draining liquid from the can, hermetically sealing the product in the can while still under steam pressure in said sterilizing chamber, and holding the sealed cans in said closed sterilizing chamber to prevent heat losses from the sealed product and to complete the sterilization of the enclosed product, which action is effected by the sterilizing heat maintained in the sealed can.

7. The method of canning which comprises introducing an open top can of product of the discrete particle type into a closed sterilizing chamber and at a given level, maintaining the chamber under high temperature and pressure, passing the upright cans along a level plane within the chamber, clamping said cans in inverted position, while transferring them to a lower level within the chamber and while holding the can contents therein, introducing live steam at a temperature and pressure in excess of that obtaining in said sterilizing chamber into the inverted cans while passing the cans through the chamber at the lower level to effect sterilization the while draining condensate from the inverted cans, bringing the cans into the higher level and releasing and re-righting the cans while still in the closed sterilizing chamber, hermetically sealing the cans while still subjected to the chamber temperature and pressure during which time sterilization of the product continues, transferring the sealed and sterilized cans from the sterilizing chamber and introducing them into a closed cooling chamber, and simultaneously maintaining the cooling chamber under a lesser temperature and pressure than that in the closed sterilizing chamber while subjecting the cans to a cooling liquid.

8. An apparatus for sterilizing a product of the discrete particle type while within a can, comprising a closed preheating chamber, means for maintaining the chamber under steam pressure in excess of atmospheric pressure, means in said chamber for conveying open top cans filled with the product therethrough, a closed sterilizing chamber located adjacent to said preheating chamber, and having means for maintaining the same under high temperature and pressure, an endless conveyor located within said sterilizing chamber for receiving the cans from said preheating chamber and for transporting them through the chamber in inverted position through part of their travel, means for clamping said cans in inverted position, steam nozzles located in said sterilizing chamber beneath the travel of the inverted cans for introducing live steam directly thereinto, the steam issuing from said nozzles being at a temperature and pressure in excess of that of the sterilizing chamber, and seaming devices located in said chamber for hermetically sealing the cans.

9. An apparatus for sterilizing a product of the discrete particle type while within a can, comprising a closed preheating chamber, a closed sterilizing chamber, means for maintaining both chambers under steam heat and pressure, said preheating chamber pressure being in excess of atmospheric pressure and said sterilizing chamber heat and pressure being greatly in excess of the heat and pressure in said preheating chamber, means for conveying open top cans filled with the product through the preheating chamber and other means for conveying the filled cans through said sterilizing chamber, said latter conveying means also inverting the cans for a part of their travel while in said sterilizing chamber, means on said other conveying means for clamping the cans while in inverted position, steam nozzles located in said sterilizing chamber for projecting steam at increased heat and pressure over that existing in said sterilizing chamber and directly into the inverted cans to quickly raise the product therein to sterilizing temperature, and seaming devices located in said sterilizing chamber for hermetically sealing the cans while still subject to the heat and pressure of said sterilizing chamber.

10. An apparatus for sterilizing a product of the discrete particle type while within a can, comprising a closed sterilizing chamber, means for maintaining the chamber under high temperature and pressure, an endless conveyor located within said chamber, feeding devices for introducing cans filled with product into said sterilizing chamber without breaking the chamber heat and pressure, said conveyor also inverting the cans and carrying the same in inverted position while holding the contents therein, screening means on said conveyor for clamping the cans against escape of their contents while in inverted position, steam nozzles located in said sterilizing chamber beneath the travel of said conveyor for introducing live steam at increased temperature and pressure over the temperature and pressure obtaining in said sterilizing chamber and directly into the inverted cans carried by said chain, to store a sterilizing heat in said product, seaming devices located in said chamber for sealing the cans and enclosing the said sterilizing heat, transfer devices for removing the sealed cans from said conveyor and from said chamber, a cooling chamber in which the sealed and sterilized cans are received from said transfer devices, and means for passing the cans through said cooling chamber to cool the same.

11. An apparatus for sterilizing a product of the discrete particle type while within a can, comprising a closed preheating chamber, means for maintaining the chamber under steam pressure in excess of atmospheric, means for conveying open top filled cans through the chamber, means for introducing the cans into said turret, means for transferring the cans from the chamber while maintaining the chamber pressure, a closed sterilizing chamber having means for maintaining the same under high temperature and pressure, an endless conveyor located within said sterilizing chamber for receiving the cans from said exit valve and for transporting them through said chamber partially in inverted position, steam nozzles located in said sterilizing chamber and beneath the travel of said conveyor for introducing live steam directly into the inverted cans at a temperature and pressure in excess of that of the chamber for sweeping out all gases from the product and for quickly raising the temperature of the product to a sterilizing temperature, seaming devices located in said sterilizing chamber for hermetically sealing the cans with the stored heat of sterilization therein, transfer devices for removing the sterilized cans from said conveyor, a cooling chamber, means for maintaining said chamber under pressure above atmospheric pressure, and a turret elevator located within said cooling chamber for conveying the sealed and sterilized cans therethrough to cool the said cans.

12. An apparatus for sterilizing a product of the discrete particle type while within a can comprising a closed sterilizing chamber, means for maintaining the chamber under high temperature and pressure, an endless conveyor located within said chamber for transporting cans through said chamber in both upright and inverted positions, can holding units carried by said conveyor, and including a screen element for holding the product within the can when the latter is inverted, means for inserting the can into a said unit of said conveyor, means within said unit for clamping the can therein, steam jets within said sterilizing chamber for projecting steam at higher temperature and pressure than that existing in said chamber and through the said screen element and into said inverted cans as they are conveyed by said conveyor thereover, and means for hermetically sealing said cans when in upright position and while still under the temperature and pressure of said sterilizing chamber.

CHARLES O. BALL.